US012585785B2

(12) United States Patent (10) Patent No.: US 12,585,785 B2

Taneja et al. (45) Date of Patent: Mar. 24, 2026

(54) CODE VULNERABILITY EVALUATOR

(71) Applicant: Bank of America Corporation, Charlotte, NC (US)

(72) Inventors: Pushkar Taneja, Hyderabad (IN); Yash Pant Dashputra, Hyderabad (IN); Sakshi Bakshi, New Delhi (IN); Amar Deep Reddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 73 days.

(21) Appl. No.: 18/581,652

(22) Filed: Feb. 20, 2024

(65) Prior Publication Data

US 2025/0265349 A1 Aug. 21, 2025

(51) Int. Cl.
G06F 21/57 (2013.01)

(52) U.S. Cl.
CPC ...... G06F 21/577 (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 9,239,745 | B1 * | 1/2016 | Pennington | ............. G06F 11/36 |
| 10,175,657 | B2 * | 1/2019 | Gupta | ................. G06F 11/3684 |
| 10,380,188 | B2 | 8/2019 | Chen et al. | |

| | | | | |
|---|---|---|---|---|
| 10,796,005 | B1 * | 10/2020 | Yi | ........................ G06F 16/2379 |
| 11,277,429 | B2 * | 3/2022 | Ababtain | ............ H04L 63/1425 |
| 11,736,298 | B2 | 8/2023 | McCarty et al. | |
| 2006/0185018 | A1 * | 8/2006 | Saretto | .................. G06F 21/577 726/25 |
| 2013/0174262 | A1 * | 7/2013 | Amit | ..................... G06F 21/577 726/25 |
| 2019/0379700 | A1 * | 12/2019 | Canzanese, Jr. | .... G06F 16/9024 |
| 2020/0097663 | A1 * | 3/2020 | Sato | ........................ G06F 21/577 |
| 2021/0056211 | A1 * | 2/2021 | Olson | ....................... G06N 5/01 |
| 2021/0279338 | A1 * | 9/2021 | Bowman | ............... G06F 21/577 |
| 2021/0336981 | A1 * | 10/2021 | Akella | ...................... G06N 7/00 |
| 2021/0336982 | A1 * | 10/2021 | Akella | ................. H04L 63/1425 |
| 2024/0305663 | A1 * | 9/2024 | Routt | .................. H04L 63/1441 |
| 2024/0333746 | A1 * | 10/2024 | Williams | ................ H04L 51/02 |
| 2025/0005165 | A1 * | 1/2025 | Robinson | .............. G06F 21/577 |
| 2025/0016193 | A1 * | 1/2025 | Mullaney | .............. G06F 40/284 |
| 2025/0045422 | A1 * | 2/2025 | Kundu | .................. G06F 21/602 |
| 2025/0265441 | A1 * | 8/2025 | Bordow | ............. H04L 63/1433 |

(Continued)

OTHER PUBLICATIONS

Zhou et al., A new method of software vulnerability detection based on a quantum neural network, Scientific Reports, 2022.*

(Continued)

*Primary Examiner* — David Garcia Cervetti

(74) *Attorney, Agent, or Firm* — Banner & Witcoff, Ltd.

(57) ABSTRACT

A computing platform provides code vulnerability detection and evaluation. The computing platform may use a quantum graph categorizer along with quantum polymorphism execution channels to reduce false positives and provide optimized real-time vulnerability evaluation of code and code segments. The computing platform may use a hybrid approach comprising a mix of static and dynamic vulnerability validation and real-time parallel technique execution.

20 Claims, 6 Drawing Sheets

(56) References Cited

U.S. PATENT DOCUMENTS

2025/0291896 A1* 9/2025 Lang, Sr. ................ G06F 21/54

OTHER PUBLICATIONS

Tudela et al., On Combining Static, Dynamic and Interactive Analysis Security Testing Tools to Improve OWASP Top Ten Security Vulnerability Detection in Web Applications, Applied Sciences, Dec. 2020.*
Rawat et al., Combining Static and Dynamic Analysis for Vulnerability Detection, arXiv, May 2013.*

* cited by examiner

102

111

112

Code Vulnerability Evaluator Platform

Processor(s)

Memory(s)

Data Gathering Module
112a

Data Processing & Conversion Module
112b

Quantum Graph Categorizer
112c

Artificial Intelligence Engine
112d

Vulnerability Scoring Module
112e

Quantum Polymorphism Execution Channel Module
112f

113

Communication Interface(s)

CODE VULNERABILITY EVALUATOR

BACKGROUND

Aspects of the disclosure relate to electrical computers, systems, and devices for determining code vulnerability.

Enterprise computer systems may be subject to many types of computer attacks, such as malware, computer viruses, worms, trojan horses, ransomware, spyware, adware, scareware, phishing, fraud, and/or other potentially harmful schemes. In some cases, executable code may be designed to perform some malicious activity to leverage a vulnerability of an enterprise network. In some cases, malicious code may be disguised as benign code and/or may be otherwise hidden so that when an application is launched, or a webpage is accessed, the malicious code may run in the background unnoticed until too late.

In addition, code vulnerabilities are always a state of concern both for web applications and non-web applications. Although multiple static and dynamic vulnerability detection methods are available today, most of the techniques involved have low code coverage providing insufficient detection. Also, increased code complexity, inclination to move towards 5G/6G networks and more and more systems becoming decentralized increases the need to have improved and resilient code vulnerability analysis. Vulnerability of code and/or sensitive data can introduce several security vulnerabilities (e.g., code with known security flaws like SQL injection, buffer overflows, integer overflow, Use-After-Free, garbage collection, etc.) which may also lead to identity theft, data manipulation, security breaches, system failures, financial fraud, reputational damage, and regulatory implications. Vulnerable code may be used to distribute malware or viruses that may damage operations. Manipulated code can also cause denial of online service outages. What is needed is a system that provides adaptive code vulnerability analysis to improve code coverage and eliminate these threats.

SUMMARY

Aspects of the disclosure provide adaptive code vulnerability analysis to improve code coverage and eliminate threats associated with vulnerable code executed in a computing environment that could lead to breaches, operational damage, or failures.

A computing platform provides code vulnerability detection and evaluation. The computing platform may use a quantum graph categorizer along with quantum polymorphism execution channels to reduce false positives and provide optimized real-time vulnerability evaluation of code and code segments. The computing platform may use a hybrid approach comprising a mix of static and dynamic vulnerability validation and real-time parallel technique execution.

In one or more instances, a code vulnerability evaluator may assist in real-time parallel reconciliation of parameters to reduce false positives and provide optimized vulnerability evaluation. In these instances, the code vulnerability evaluator may isolate and allow for further analysis of vulnerable code for additional insights and system security.

BRIEF DESCRIPTION OF DRAWINGS

The present disclosure is illustrated by way of example and is not limited to the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a code vulnerability evaluator. The code vulnerability evaluator may use a hybrid approach comprising a mix of static and dynamic vulnerability validation and real-time parallel technique execution and reconciliation. The code vulnerability evaluator may also use a dynamic quantum graph categorizer and quantum polymorphism-backed vulnerability evaluator. The quantum graph categorizer may be a QDENN based smart categorizer that uses graph neural networks in addition to QNN along with dynamic quantum keys to tag and connect different quantum categories on a real-time basis. The categorized vulnerability outputs may then be consumed by a quantum polymorphism-backed vulnerability evaluator which uses the input information to identify the type of vulnerability and evaluate the reconciliation ratio to execute the vulnerability evaluation through quantum polymorphism execution channels that are based on quantum entangled versioning.

Figure 1:
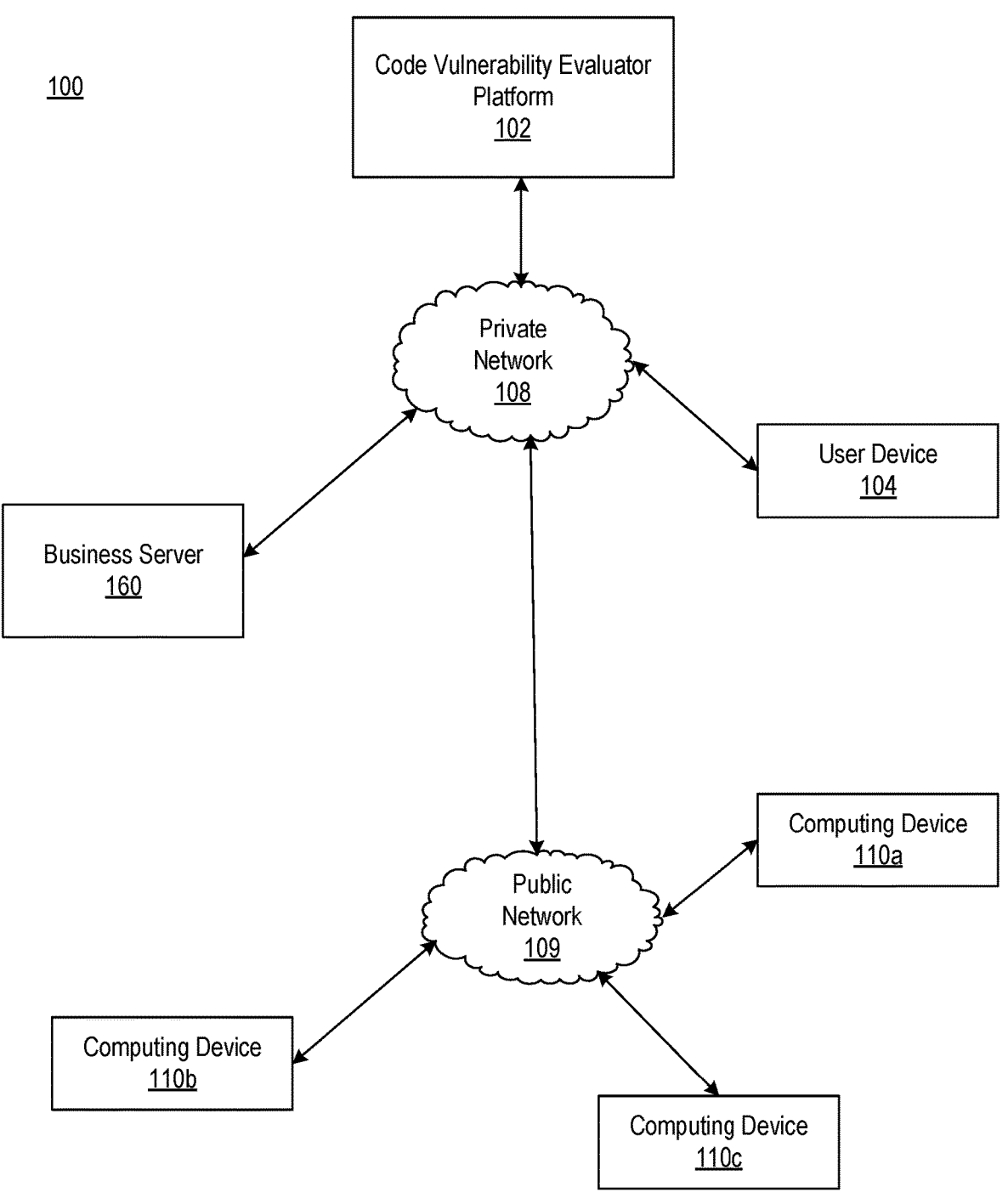
FIG. 1 depicts an illustrative computing environment for implementing a code vulnerability evaluator platform in accordance with one or more example embodiments.

FIG. 1 depicts an illustrative computing environment for implementing a code vulnerability evaluator in accordance with one or more example embodiments. Referring to FIG. 1, computing environment 100 may include one or more computer devices and/or systems. For example, computing environment 100 may include code vulnerability evaluator platform 102, business server 160, user device 104, and computing devices 110a, 110b, and 110c. The above systems and devices may be communicatively coupled via one or more computing networks (e.g., private network 101, public network 109, and the like).

Code vulnerability evaluator 102 may include one or more computing devices (servers, server blades, or the like) and/or other computer components (e.g., processors, memories, communication interfaces, or the like). In some instances, the code vulnerability evaluator 102 may further be configured to train, host, and execute other machine learning models to monitor and evaluate code or code segments before execution of code to prevent the activity of threat actors on private network 101.

User device 104 may be or include one or more devices (e.g., laptop computers, desktop computer, smartphones, tablets, and/or other devices) configured for use in conducting business on behalf of the enterprise organization. In some instances, the user device 104 may be operated by an employee of the enterprise organization. In some instances, the user device 104 may be configured to display graphical user interfaces (e.g., information interfaces, or the like). Any number of such user devices may be used to implement the techniques described herein without departing from the scope of the disclosure.

Business server 160 may be or include one or more devices (e.g., laptop computers, desktop computers, smartphones, tablets, and/or other devices) configured for use in conducting enterprise business. Numerous business servers along with business server 160 may be networked to provide applications and information to users of the enterprise organization.

In one or more arrangements, code vulnerability evaluator 102, user device 104, and business server 160 may be any type of computing device capable of receiving a user interface, receiving input via the user interface, and communicating the received input to one or more other computing devices. For example, code vulnerability evaluator 102, user device 104, business server 160, and/or the other systems included in computing environment 100 may, in some instances, be and/or include server computers, desktop computers, laptop computers, tablet computers, smartphones, or the like that may include one or more processors, memories, communication interfaces, storage devices, and/or other components. As noted above, and as illustrated in greater detail below, any and/or all of code vulnerability evaluator 102, user device 104, and business server 160 may, in some instances, be special-purpose computing devices configured to perform specific functions.

Figure 2:
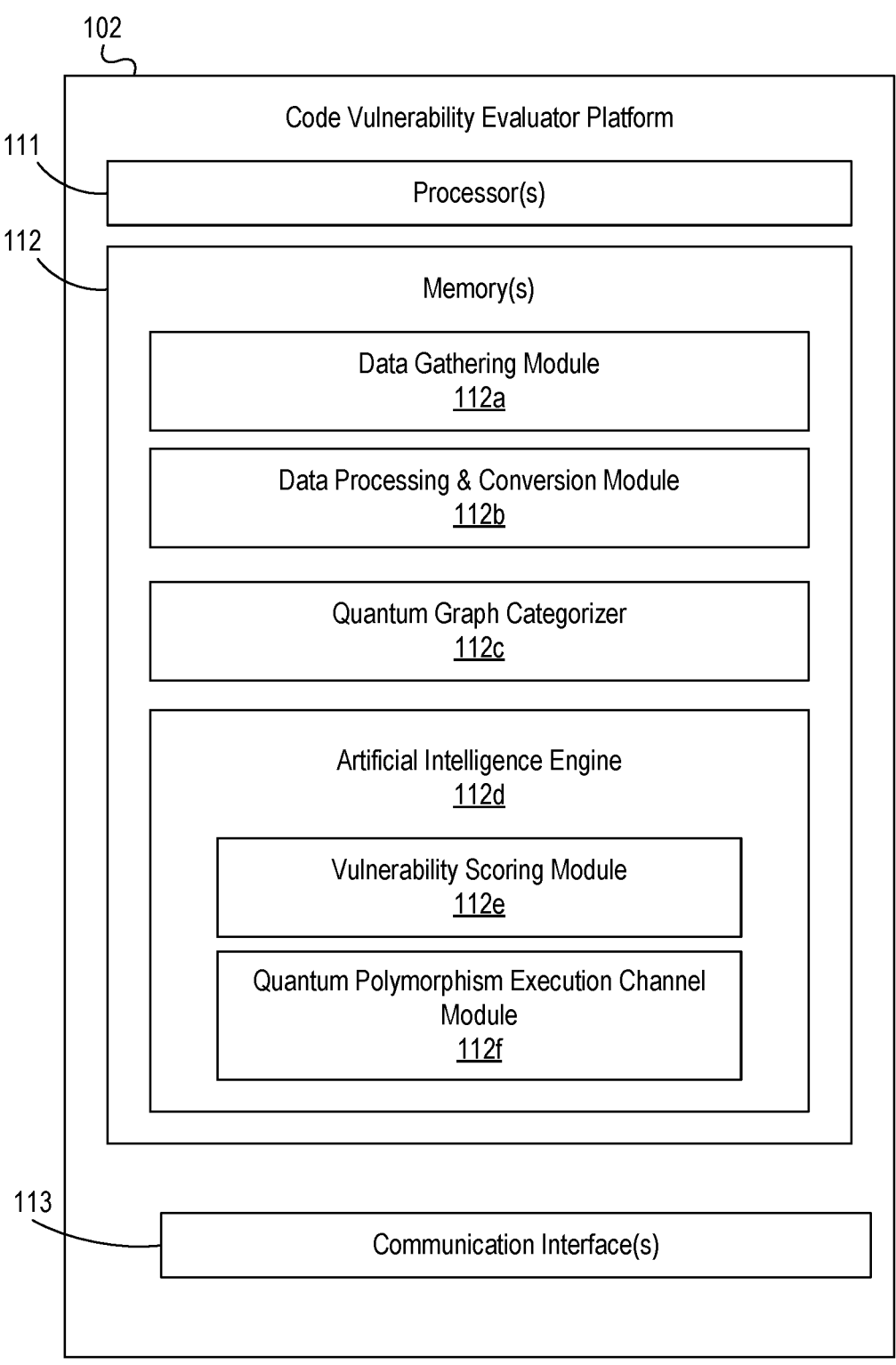
FIG. 2 depicts an illustrative code vulnerability evaluator for analyzing and determining vulnerable code with the code vulnerability evaluator in accordance with one or more example embodiments.

Referring to FIG. 2, code vulnerability evaluator 102 may include one or more processors 111, memory 112, and communication interface 113. A data bus may interconnect processor 111, memory 112, and communication interface 113. Communication interface 113 may be a network interface configured to support communication between code vulnerability evaluator 102 and one or more networks (e.g., network 108, or the like).

Memory 112 may include one or more program modules having instructions that when executed by processor 111 cause code vulnerability evaluator 102 to perform one or more functions described herein and/or one or more databases that may store and/or otherwise maintain information that may be used by such program modules and/or processor 111. In some instances, one or more program modules and/or databases may be stored by and/or maintained in different memory units of code vulnerability evaluator 102 and/or by different computing devices that may form and/or otherwise make up code vulnerability evaluator 102. For example, memory 112 may have, host, store, and/or include data gathering module 112*a*, data processing and conversion module 112*b*, quantum graph categorizer 112*c*, artificial intelligence engine 112*d*, vulnerability scoring module 112*e*, and quantum polymorphism execution channel module 112*f*.

Code vulnerability evaluator 102 may use quantum graph categorizer 112*c* to hold together security vulnerability parameters in a qubit of a code base. The security vulnerability parameters may include SQL injection, buffer overflow, XML External Entity (XXE) Attack, Insecure Direct Object References, and Security Misconfiguration, etc. In an embodiment, multiple qubits together may form the end-to-end system workflow that is linked together using quantum keys which are unique to these sets of qubits. Together this combination may form a dynamic quantum-graph network which is supported by QDENN and a graphical neural artificial intelligence engine to identify the categories and process the parameter flows. These quantum-enabled intelligent graph networks may be used to relate multiple test cases to the identified dynamic categories. These categories may be enabled by parameterized qubits. These test case execution flows may be flagged using a reconciliation ratio to determine an execution plan.

In an embodiment, the reconciliation ratio may be the ratio of vulnerability scoring between static and dynamic vulnerability analysis. This ratio may assist in determining the combination of vulnerability test case execution plans basis.

The reconciliation ratio may be determined by artificial intelligence engine 112*d*. The scoring may be based on multiple predefined criteria that include type of application, previous history, development/deployment stage, etc. In an embodiment, the reconciliation ratio may determine the combination of vulnerability test case plans basis, the susceptible static/dynamic vulnerability scenarios. A static vulnerability score and a dynamic vulnerability score may be determined by vulnerability scoring module 112*e*.

For instance, in an embodiment, if the static vulnerability score is greater than the dynamic vulnerability score, then a combination of more static code checks may be implemented. These static code checks may include rule matching, code comparison, and/or symbolic execution with fewer dynamic vulnerability checks.

In another embodiment, if the dynamic vulnerability score is greater than the static vulnerability score, then a combination of more dynamic code checks may be implemented. These dynamic code checks may include fuzzing tests and taint analysis.

In an embodiment, the vulnerability score-based code checks reduce false positives and may ensure that more weight is given to specific types of test evaluation results based on the code or code segment being evaluated.

In an aspect of the disclosure, polymorphism is the ability of an entity/object to take more than one form. Using the polymorphism over quantum entangled qubits, the quantum polymorphism execution channels may enable the implementation of identified vulnerability tests in parallel on the code base. This code base may be replicated and enable virtual copies for parallel execution and reconciliation to eliminate false positives and identify potential vulnerabilities.

These quantum polymorphism execution channel module 112*f* may use quantum entanglement to ensure the evaluation results of one set of test cases are reconciled with other test results to flag any discrepancy that helps the artificial intelligence engine 112*d* to eliminate any false positives and provide optimized through code vulnerability evaluation metrics.

In an embodiment, artificial intelligence engine 112*d* may analyze the results and set threshold levels obtained from the quantum entangled network to detect code vulnerabilities based on the encoded qubit status.

Artificial intelligence engine 112 may continuously refine and optimize the quantum-based deep learning model. The deep learning model may be used to train, deploy, and/or otherwise refine models used to support the functionality of the code vulnerability evaluator 102 through both initial training and one or more dynamic feedback loops, which may, e.g., enable continuous improvement of the code vulnerability evaluator 102 and further optimize the vulnerable code detection.

In some instances, in training the machine learning model, code vulnerability evaluator 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neural networks, and/or other unsupervised models/techniques), and/or other techniques.

Figure 3:
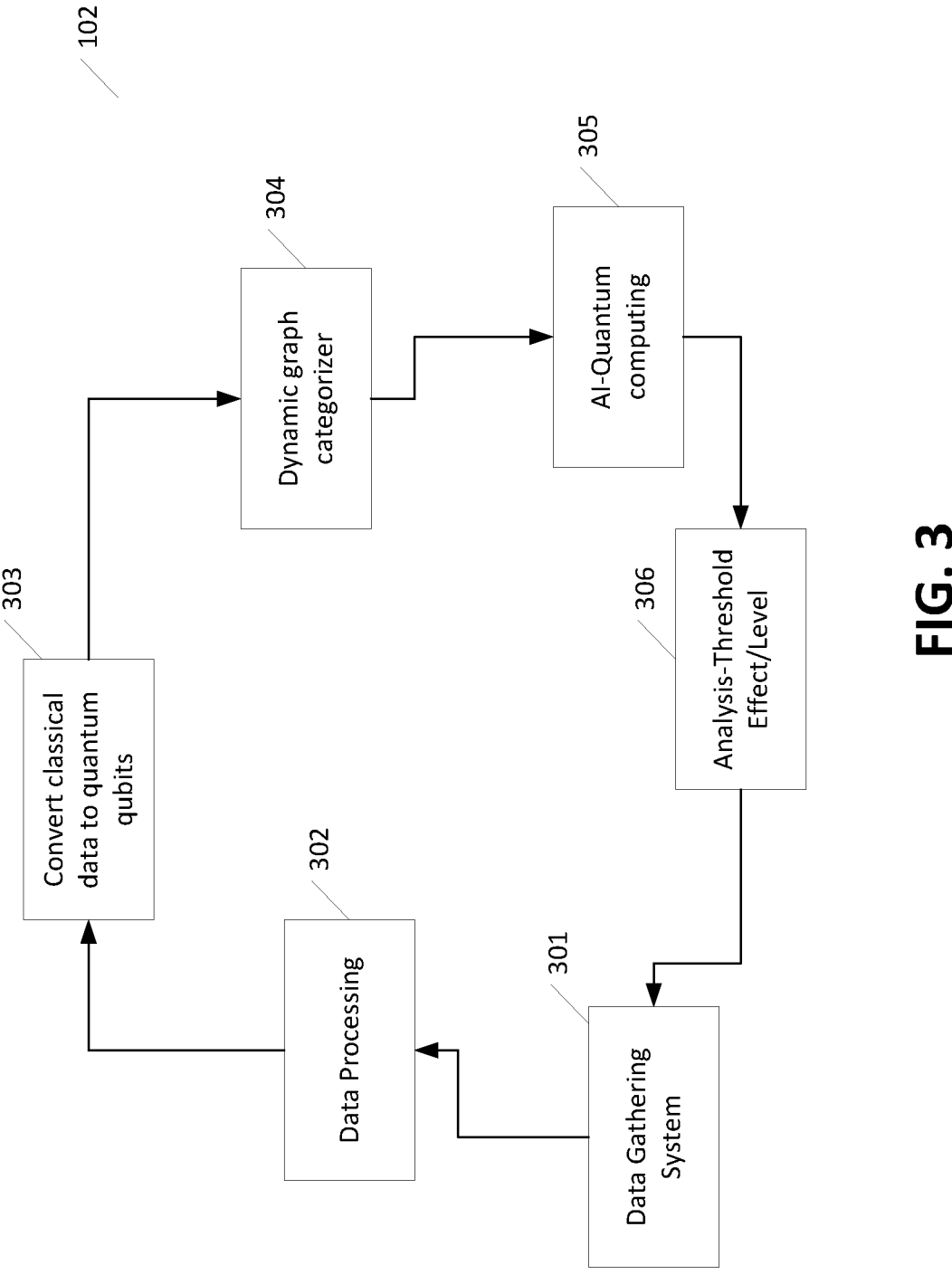
FIGS. 3-6 depict illustrative flow diagrams for a code vulnerability evaluator in accordance with one or more example embodiments.
Figure 4:
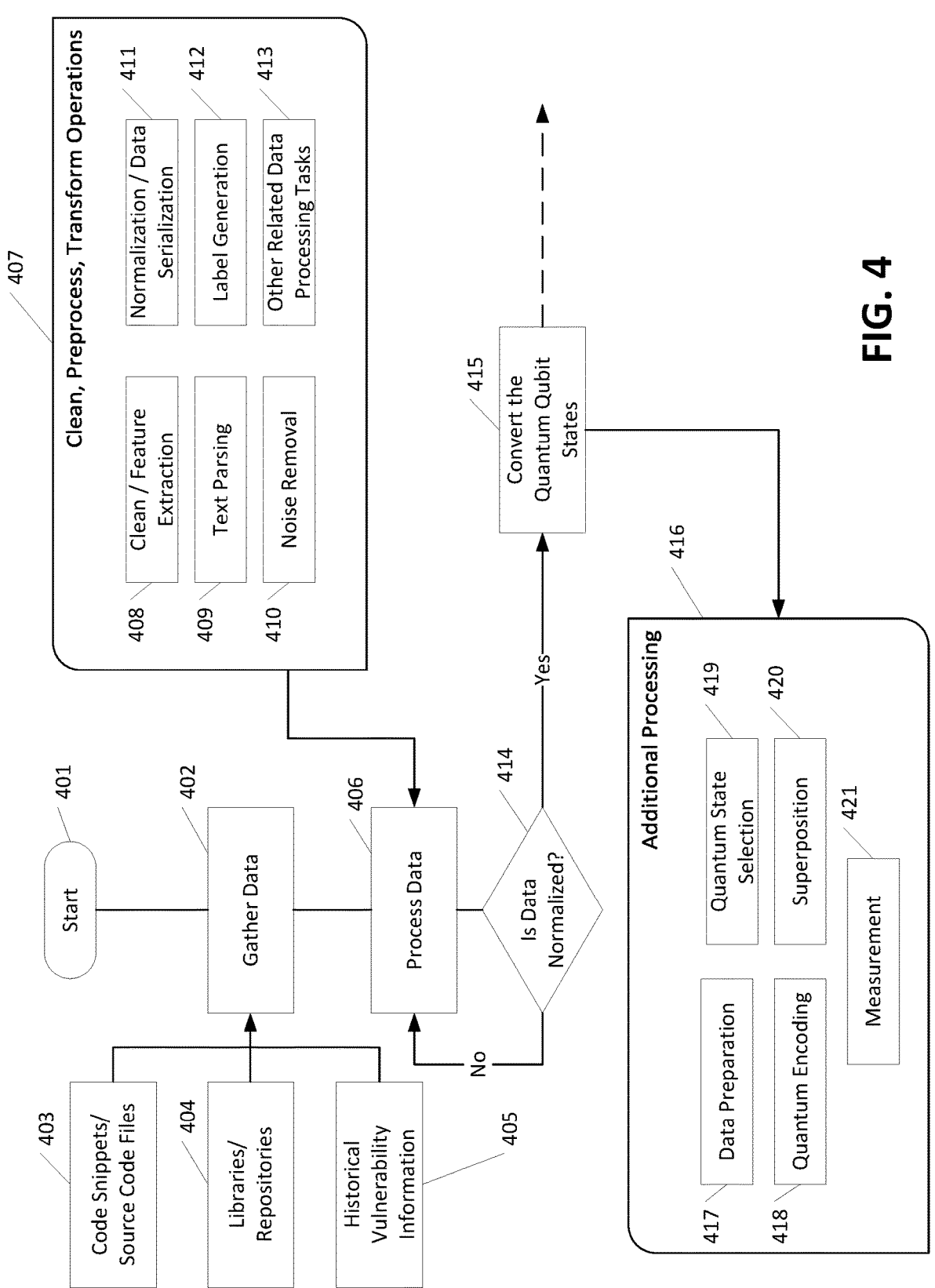
Figure 5:
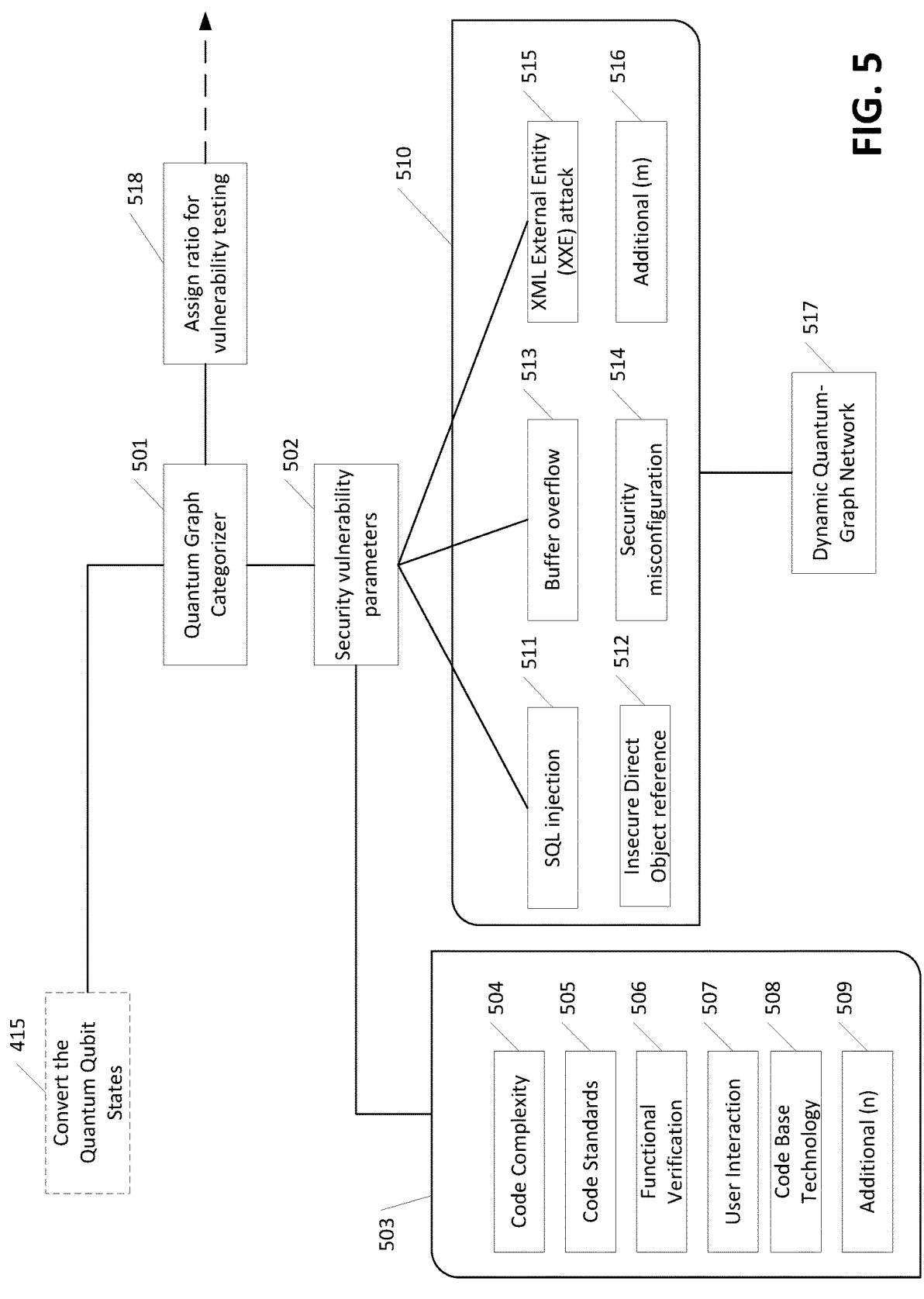
Figure 6:
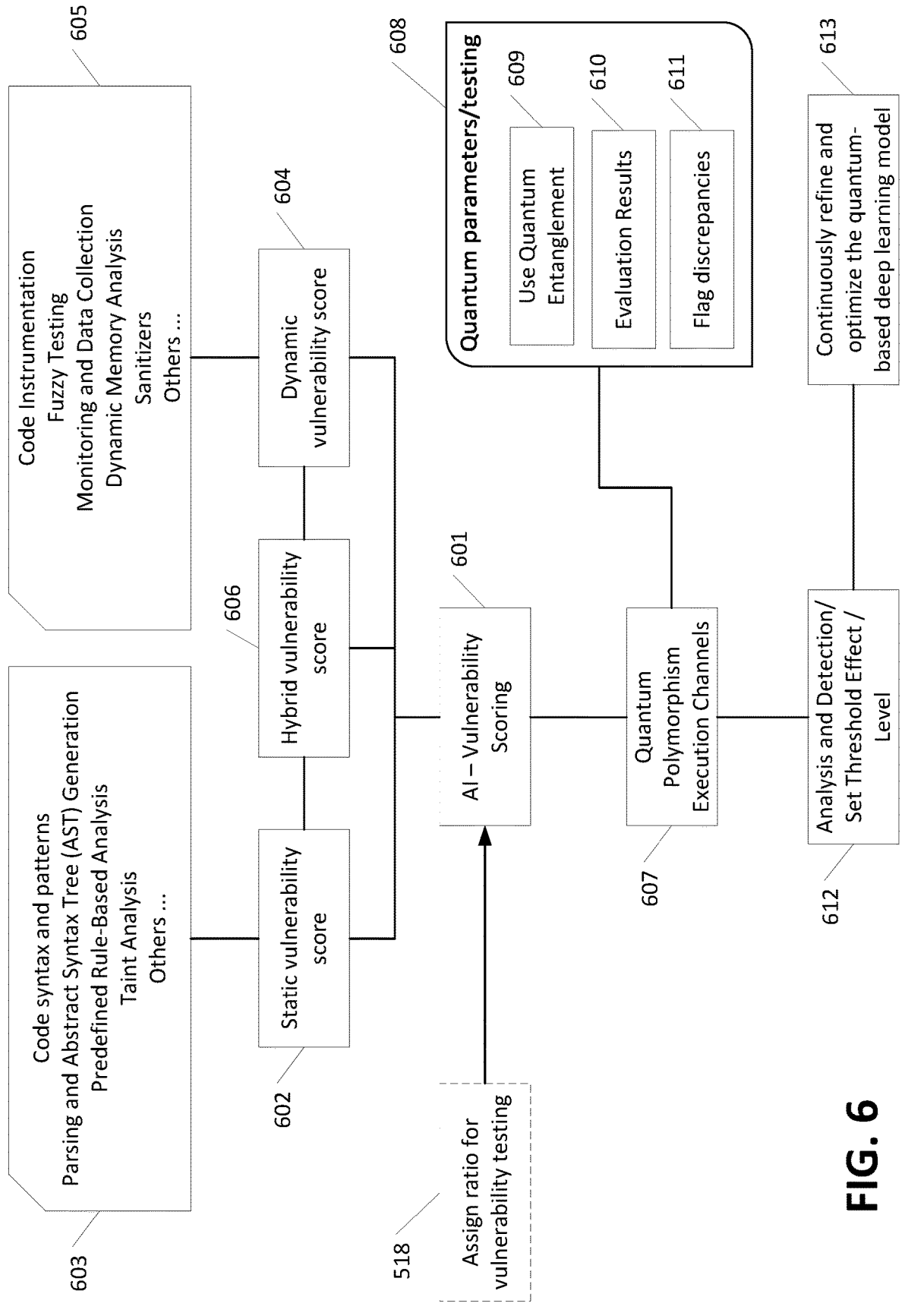

FIGS. 3-6 depict illustrative flow diagrams for a code vulnerability evaluator in accordance with one or more example embodiments. For instance, FIG. 3 illustrates the architectural flow diagram of a code vulnerability platform 102 that includes a data gathering system 301, data processing 302, converting of data to quantum qubits 303, utilization of a dynamic graph categorizer 304, artificial intelligence quantum computing 305, analysis-threshold effect level 306, and interactive refinements. FIGS. 4-6 provide detailed process flow charts and process illustrations of the code vulnerability system FIG. 3.

In FIG. 4 the process begins at step 401. Code vulnerability evaluator 102 includes a data gathering system 402 that may collect data related to code vulnerabilities. The data may include code snippets and source code files 403, libraries and repositories 404, and historical vulnerability information 405. The collected data may be processed 406 and normalized. Processing the data may include cleaning and/or feature extraction 408, text parsing 409, and noise removal 410. Processing of the gathered data may also include normalization and/or data serialization 411, label generation 412, or other related processing tasks 413.

In an embodiment, code vulnerability elevator 102 checks if processed data has been normalized. If the data has not been normalized it is reprocessed before it is converted to quantum qubits 415.

The normalized processed data may be encoded in quantum states. The encoding may include binary encoding in which the data is represented using qubits, with 0 and 1 corresponding to the basic states. Additionally, superposition encoding may also be utilized.

In an embodiment, the quantum qubit states that represent vulnerability types may be converted into hexadecimal format for additional processing.

Additional processing 416 may also be applied during conversion to quantum qubit states. The additional processing may include quantum operations to perform operations, process the data, or perform other tasks. The additional processing may include data preparation 417, quantum encoding 418, quantum state selection 419, superposition 420, and measurement 421.

The converted data may be directed to quantum graph categorizer 501. Code vulnerability evaluator 102 may use quantum graph categorizer 501 to hold together security vulnerability parameters in a qubit of a code base. The security vulnerability parameters may include SQL injection 511, buffer overflow 513, XML External Entity (XXE) Attack 515, Insecure Direct Object References 512, Security Misconfiguration 514, and additional parameters (m) 516. Additional parameters that may be taken into consideration include code complexity 504, coding standards 505, functional verification 506, user interaction 507, code base technology, and other additional parameters (n) 509.

In an embodiment, multiple qubits together may form the end-to-end system workflow that is linked together using quantum keys which are unique to these sets of qubits. Together this combination may form a dynamic quantum-graph network 507 which is supported by QDENN and a graphical neural artificial intelligence engine to identify the categories and process the parameter flows. These quantum-enabled intelligent graph networks may be used to relate multiple test cases to the identified dynamic categories. These categories may be enabled by parameterized qubits.

As shown in 518, the results of the quantum graph categorizer 501 may be used to determine a reconciliation ratio for vulnerability testing. In an embodiment, the reconciliation ratio may be the ratio of vulnerability scoring between static and dynamic vulnerability analysis. This ratio may assist in determining the combination of vulnerability test case execution plans basis.

The reconciliation ratio may be determined by artificial intelligence engine 112d. The scoring may be based on multiple predefined criteria that include type of application, previous history, development/deployment stage, etc. In an embodiment, the reconciliation ratio may determine the combination of vulnerability test case plans basis, the susceptible static/dynamic vulnerability scenarios. A static vulnerability score and a dynamic vulnerability score may be determined by the artificial intelligence vulnerability scoring module 112e at step 601.

In an embodiment, vulnerability scoring may include a static vulnerability score of 602, a hybrid vulnerability score of 606, and a dynamic vulnerability score 604. The results of the scoring may determine the number and type of code checks and/or tests to be performed. For instance, code checks and tests may include analyzing code syntax and patterns, parsing and abstract tree generation, predefined rule-based analysis, taint analysis, and others as shown at 603. Additional checks and tests may include code instrumentation, fuzzy testing, monitoring and data collection, dynamic memory analysis, sanitizers, and others as shown in 605. Selection of the tests to be used may be based on the numerical value of the static vulnerability score 602, the dynamic vulnerability score 604, and the hybrid vulnerability score 606. In an embodiment, the vulnerability score-based code checks reduce false positives and may ensure that more weight is given to specific types of test evaluation results based on the code or code segment being evaluated.

After scoring the quantum polymorphism execution channels 607 may enable the implementation of identified vulnerability tests in parallel on the code base. This code base may be replicated and enable virtual copies for parallel execution and reconciliation to eliminate false positives and identify potential vulnerabilities.

These quantum polymorphism execution channel module 112f may use quantum entanglement 609 to ensure the evaluation results 610 of one set of test cases are reconciled with other test results to flag any discrepancy 611 that helps the artificial intelligence engine 112d to eliminate any false positives and provide optimized through code vulnerability evaluation metrics.

In an embodiment, artificial intelligence engine 112d may analyze the results and set threshold levels 612 obtained from the quantum entangled network to detect code vulnerabilities based on the encoded qubit status.

Artificial intelligence engine 112 may continuously refine and optimize the quantum-based deep learning model as shown in 613. The deep learning model may be used to train, deploy, and/or otherwise refine models used to support the functionality of the code vulnerability evaluator 102 through both initial training and one or more dynamic feedback loops, which may, e.g., enable continuous improvement of the code vulnerability evaluator 102 and further optimize the vulnerable code detection.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive data related to code vulnerabilities;
   generate a quantum graph network using a quantum graph categorizer and the received data related to code vulnerabilities, wherein the quantum graph network is a dynamic quantum-graph network supported by a quantum deep embedding neural network (QDENN) and a graphical neural artificial intelligence engine;
   determine a reconciliation ratio, wherein the reconciliation ratio is a ratio of vulnerability scoring between static and dynamic vulnerability analysis;
   based on the reconciliation ratio, determine a vulnerability test case execution plan; and
   execute the determined vulnerability test case execution plan to determine code vulnerabilities, wherein executing the determined vulnerability test case execution plan to determine code vulnerabilities comprises using quantum entanglement to ensure evaluation results of one set of test cases are reconciled with other test results to flag any discrepancy.

2. The computing platform of claim 1, wherein the memory stores additional computer-readable instructions that, when executed by the at least one processor, cause the computing platform to convert the received data related to the code vulnerabilities to quantum qubits.

3. The computing platform of claim 2, wherein the determined reconciliation ratio further includes determining a static vulnerability score, a hybrid vulnerability score, and a dynamic vulnerability score.

4. The computing platform of claim 3 wherein the memory stores additional computer-readable instructions that, when executed by the at least one processor, cause the computing platform, to compare the static vulnerability score to the dynamic vulnerability score.

5. The computing platform of claim 4, wherein the memory stores additional computer-readable instructions that, when executed by the at least one processor, cause the computing platform to modify the determined vulnerability test case execution plan to contain additional static code checks if the determined static vulnerability test score is greater than the dynamic vulnerability score.

6. The computing platform of claim 5, wherein static code checks comprise analyzing code syntax and patterns, parsing and abstract tree generation, and predefined rule-based analysis.

7. The computing platform of claim 4, wherein the memory stores additional computer-readable instructions that, when executed by the at least one processor, cause the computing platform to modify the determined vulnerability test case execution plan to contain additional dynamic code checks if the determined dynamic vulnerability test score is greater than the static vulnerability score.

8. The computing platform of claim 7, wherein the code checks comprise code instrumentation, fuzzy testing, monitoring and data collection, dynamic memory analysis, taint analysis, and sanitizers, and wherein the code checks are executed using quantum polymorphism execution channels that enable dynamic virtual copies of the code to be executed in parallel and reconciled using quantum entanglement to ensure evaluation results of one set of test cases are reconciled with other test results to flag any discrepancy and eliminate false positives.

9. The computing platform of claim 1, wherein executing the determined vulnerability test case execution plan to determine code vulnerabilities comprises quantum polymorphism execution channels to enable dynamic virtual copies of the code to be executed in parallel and reconciled for the vulnerability test case execution plan.

10. A method comprising:
at a computing platform comprising at least one processor, a communication interface, and memory:
receiving data related to code vulnerabilities;
generating a quantum graph network using a quantum graph categorizer and the received data related to code vulnerabilities, wherein the quantum graph network is a dynamic quantum-graph network supported by a quantum deep embedding neural network (QDENN) and a graphical neural artificial intelligence engine;
determining a reconciliation ratio, wherein the reconciliation ratio is a ratio of vulnerability scoring between static and dynamic vulnerability analysis;
based on the reconciliation ratio, determining a vulnerability test case execution plan; and
executing the determined vulnerability test case execution plan to determine code vulnerabilities, wherein executing the determined vulnerability test case execution plan to determine code vulnerabilities comprises using quantum entanglement to ensure evaluation results of one set of test cases are reconciled with other test results to flag any discrepancy.

11. The method of claim 10 further comprising causing the computing platform to convert the received data related to the code vulnerabilities to quantum qubits.

12. The method of claim 11 further comprising: determining that the reconciliation ratio further includes determining a static vulnerability score, a hybrid vulnerability score, and a dynamic vulnerability score.

13. The method of claim 12, further comprising comparing the static vulnerability score to the dynamic vulnerability score.

14. The method of claim 13, wherein modifying the determined vulnerability test case execution plan to contain additional static code checks if the determined static vulnerability test score is greater than the dynamic vulnerability score.

15. The method of claim 13, further comprising modifying the determined vulnerability test case execution plan to contain additional dynamic code checks if the determined dynamic vulnerability test score is greater than the static vulnerability score, wherein the additional dynamic code checks comprise fuzzing tests and taint analysis, wherein modifying the determined vulnerability test case execution plan is based on multiple predefined criteria including type of application, previous history, and development/deployment stage, and wherein the additional dynamic code checks are executed using quantum polymorphism execution channels that enable parallel execution on virtual copies of the code and use quantum entanglement to reconcile evaluation results and flag discrepancies to reduce false positives.

16. The method of claim 10, wherein executing the determined vulnerability test case execution plan to determine code vulnerabilities comprises quantum polymorphism execution channels to enable dynamic virtual copies of the code to be executed in parallel and reconciled for the vulnerability test case execution plan.

17. One or more non-transitory computer-readable media storing instructions that, when executed by a computing platform comprising at least one processor, a communication interface, and memory, cause the computing platform to:
receive data related to code vulnerabilities;
generate a quantum graph network using a quantum graph categorizer and the received data related to code vulnerabilities, wherein the quantum graph network is a dynamic quantum-graph network supported by a quantum deep embedding neural network (QDENN) and a graphical neural artificial intelligence engine;
determine a reconciliation ratio, wherein the reconciliation ratio is a ratio of vulnerability scoring between static and dynamic vulnerability analysis;
based on the reconciliation ratio, determine a vulnerability test case execution plan; and
execute the determined vulnerability test case execution plan to determine code vulnerabilities, wherein executing the determined vulnerability test case execution plan to determine code vulnerabilities comprises using quantum entanglement to ensure evaluation results of one set of test cases are reconciled with other test results to flag any discrepancy.

18. The one or more non-transitory computer-readable media storing instructions of claim 17, that when executed by the computing platform comprising at least one processor, a communication interface, and memory, further cause the computing platform to convert the received data related to the code vulnerabilities to quantum qubits.

19. The one or more non-transitory computer-readable media storing instructions of claim 17, wherein the determined reconciliation ratio further includes determining a static vulnerability score, a hybrid vulnerability score, and a dynamic vulnerability score.

20. One or more non-transitory computer-readable media storing instructions of claim 19, that when executed by the computing platform comprising at least one processor, a communication interface, and memory, further cause the computing platform to compare the static vulnerability score to the dynamic vulnerability score.

* * * * *